United States Patent

Oetiker

[11] Patent Number: 5,127,157
[45] Date of Patent: Jul. 7, 1992

[54] METHOD OF FASTENING HOSE TO NIPPLE

[76] Inventor: Hans Oetiker, Oberdorfstrasse 21, CH-8812 Horgen, Switzerland

[21] Appl. No.: 409,721

[22] Filed: Sep. 20, 1989

Related U.S. Application Data

[63] Continuation-in-part of Ser. No. 306,763, Feb. 6, 1989, Pat No. 5,096,234.

[51] Int. Cl.⁵ .................. B21D 39/00; B21D 53/00
[52] U.S. Cl. .................. 29/890.144; 29/507; 29/508; 29/517; 29/523
[58] Field of Search ........... 29/890.144, 506, 507, 29/508, 516, 517, 522.1, 523

[56] References Cited

U.S. PATENT DOCUMENTS

| | | |
|---|---|---|
| 1,786,489 | 12/1930 | Hopkins . |
| 1,825,005 | 9/1931 | Loughead . |
| 2,216,839 | 10/1940 | Hoffman . |
| 2,377,010 | 5/1945 | Howard .......................... 285/258 X |
| 2,399,790 | 5/1946 | Conroy .......................... 285/258 X |
| 2,595,900 | 5/1952 | Soos .............................. 285/258 X |
| 2,865,094 | 12/1958 | Press . |
| 4,548,430 | 10/1985 | Haubert et al. ................ 29/516 X |
| 4,689,868 | 9/1987 | Hughes et al. ................. 29/523 |
| 4,832,377 | 5/1989 | Umehara ....................... 29/523 X |
| 4,850,620 | 7/1989 | Puls ............................... 29/523 X |

FOREIGN PATENT DOCUMENTS 2532624 2/1977 Fed. Rep. of Germany .

Primary Examiner—Timothy V. Eley
Attorney, Agent, or Firm—Paul M. Craig, Jr.

[57] ABSTRACT

A hose connection for high pressure installations and a method for making the same in which a nipple provided with externally projecting beads or ribs of annular configuration is initially internally expanded to substantially the inner diameter of the hose by an expanding tool while the hose is constrained against radially outward movement by a cylindrical sleeve-like member having a smooth internal surface. The sleeve-like member secured to the nipple is subjected to at least one subsequently realized inwardly extending deformation which may be made by a crimping tool; in case of annular rolled-in grooves, the latter is preferably so arranged that the deepest point of the annular grooves are located between peaks of adjacent beads or ribs. By appropriately coordinating the expansion of the nipple and subsequent contraction of the sleeve-like member to the dimension and characteristics of the hose material, a high pressure connection can also be realized for a hose reinforced by a metallic sheath which avoids any significant dislocations and structural changes in the reinforcing sheath.

23 Claims, 4 Drawing Sheets

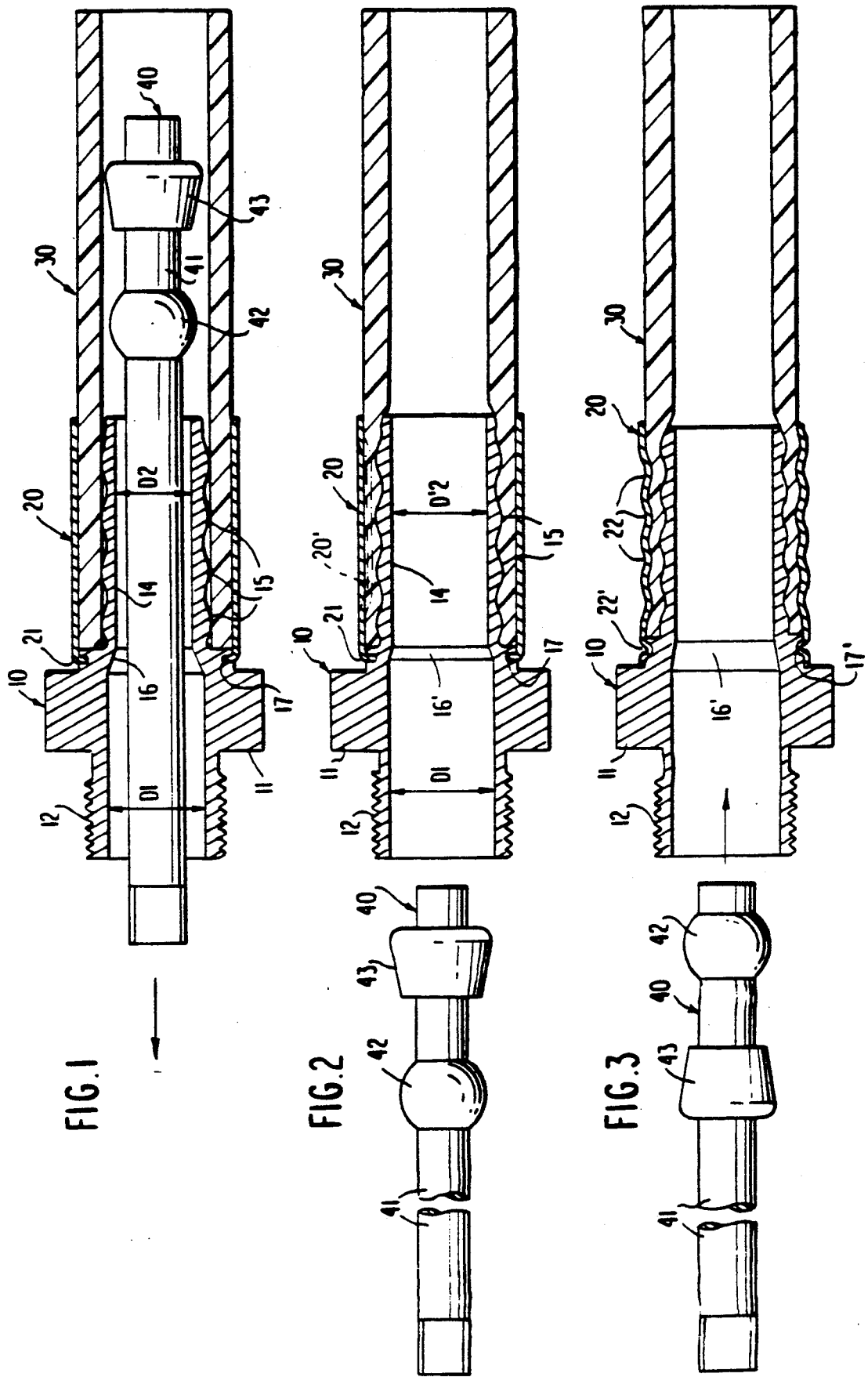

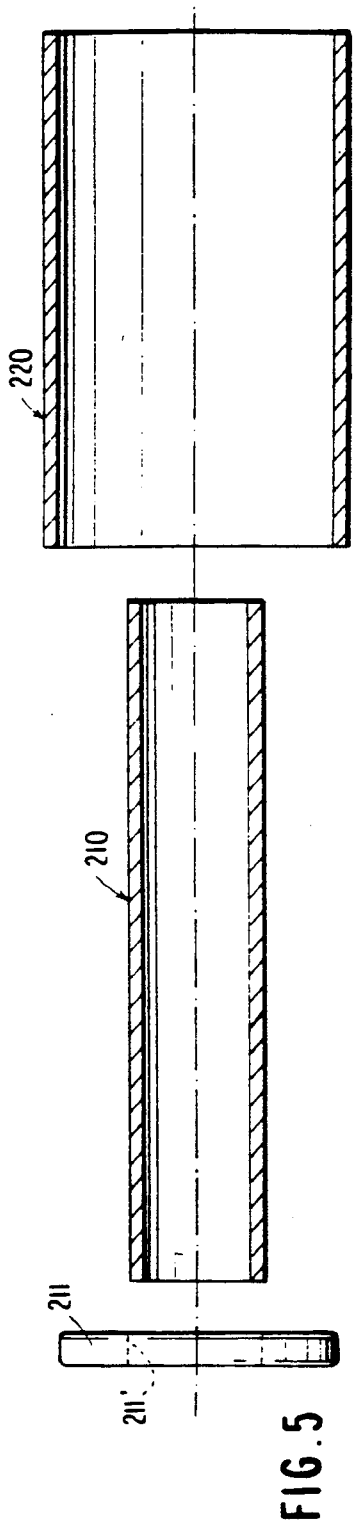
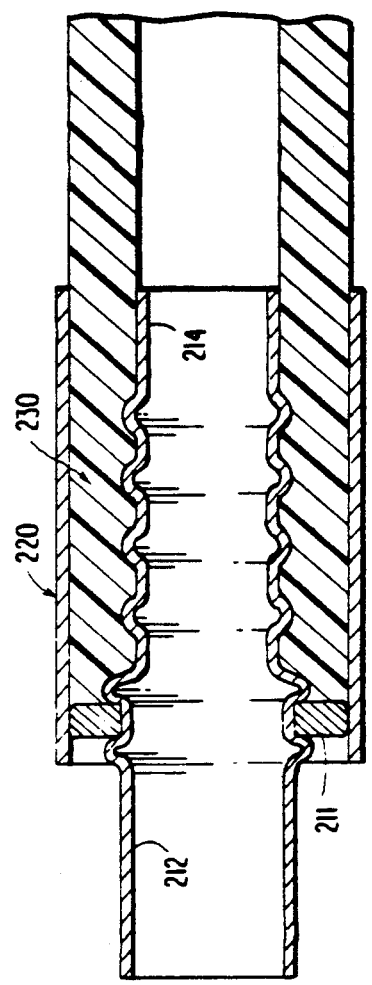
FIG.5
FIG.6
FIG.7

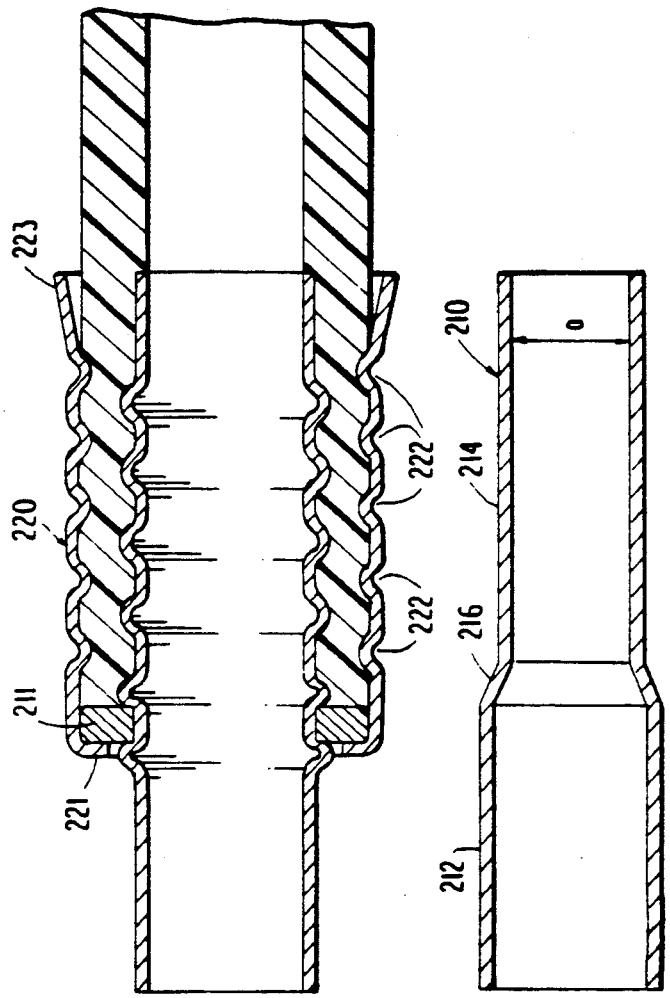
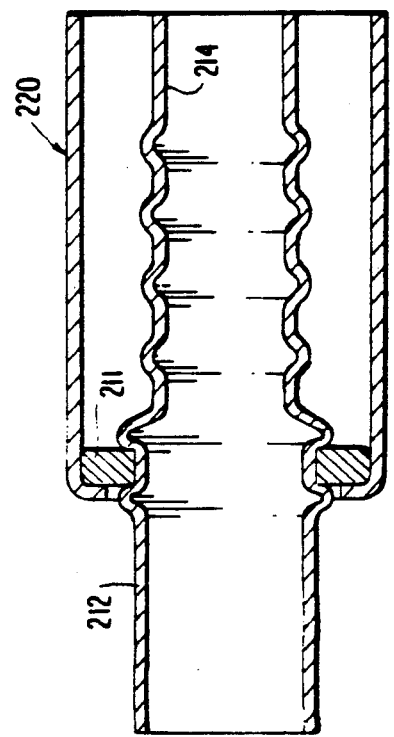
FIG. 8  FIG. 9  FIG. 10

METHOD OF FASTENING HOSE TO NIPPLE

This application is a continuation-in-part application of my copending application Ser. No. 07/306,763, filed Feb. 6, 1989 now U.S. Pat. No. 5,096,234 and entitled "Method of Fastening Hose to Nipple and Hose Connection Obtained by Such Method."

FIELD OF INVENTION

The present invention relates to a method for securely fastening a hose onto a nipple and to a hose connection with the nipple obtained by the use of such method which is able to reliably withstand extremely high pressures.

PRIOR ART

Hose connections, particularly high pressure hose connections for use with heavy-duty equipment such as road construction equipment which must be capable of withstanding relatively high pressures that are simple in construction and easy to install, have already received repeated attention heretofore. However, no simple solution capable of reliably withstanding relatively very high pressures has been available so far.

My own prior U.S. Pat. No. 3,870,349 offered the possibility of realizing extraordinarily good hose connections with high pressure hoses which proved superior to other hose connections on the market. A hose connection according to my aforementioned patent installed on both sides of hoses permitted to reach high pressures at which the hoses burst. However, apart from the fact that the hose connection according to my aforementioned prior patent was relatively costly, it was not possible by its use at both ends of a hose to realize hose connections which reliably assured bursting of all available hoses and to maintain complete tightness up to the bursting pressure of a given hose.

Additionally, the high pressure hose connections available on the market which came to my attention, utilized beads at the nipple and/or the outer sleeve-like member that had sharp edges, apparently required to obtain a sufficient retaining action, even though such sharp edges proved inadequate to maintain tightness up to the bursting pressure of the hose. However, such sharp edges entail the significant disadvantage that a part of the hose material may already be destroyed during the installation of the hose connection by cutting or otherwise damaging the hose material.

I have now discovered that the drawbacks encountered with the prior art hose connections can be avoided in a surprisingly simple manner by utilizing a nipple provided with externally projecting beads or ribs which is expanded after the hose is mounted over the nipple while confined in the radially outward direction by a sleeve-like member, whereupon the sleeve-like member is reduced in diametric dimensions, for example, by compressing or rolling-in the sleeve-like member.

Various proposals have been made in the prior art to use internal expansion of the nipple and/or external compression of a ferrule-like member. However, all of the prior art suggestions entail certain disadvantages counter-productive to realizing a very simple high-pressure hose connection which is very reliable in operation and which can also be established in the field, for example, for repair purposes when failures occur in the high-pressure line(s) of road construction equipment.

Furthermore, none of the prior art known to me suggests the particular method in accordance with the present invention which consists in first internally expanding the nipple and only thereafter compressing the sleeve member. However, as will become more apparent hereinafter, this sequence is important for several reasons.

A frequently encountered drawback with many of the prior art suggestions resides in the use of threads or serrations utilizing sharp teeth. However, the use of such threads or serrations is likely to damage the hose by the sharp edges provided thereon which is likely to lead to failures of the hose connection at the very high pressures contemplated by this invention.

Thus, the U.S. Pat. No. 2,865,094 to Press utilizes a socket which must be of a certain thickness to permit machining of the internal spiral threads into the same. However, a spiral thread always poses serious problems as regards leakages. Additionally, sharp-edged serrations are used on the nipple which itself must be provided with an external thread for connection with the socket. As this coupling was intended primarily for Teflon hoses with steel wire braid covering, the patent discloses initially the crimping of the socket from the outside to such an extent that an observable permanent reduction in the internal diameter of the nipple takes place. This requires additional internal expansion and therewith additional forces if the nipple is to be expanded to the internal diametric dimension of the hose to avoid flow losses.

The U.S. Pat. No. 2,399,790 to Conroy is concerned with reinforced hoses utilizing a metal braid that may be damaged during the assembly of the coupling. For that reason, this patent suggests expanding the coupling insert and contracting the outer shell in substantially equal proportions at the same time without disturbing the normal diameter of the hose. Contrary to the present invention, this patent provides a smooth external surface of the nipple insert and an outer shell provided with internal gripping threads. The required structure necessary to permit simultaneous expanding and compression also adds to the manufacturing costs of the various parts.

The U.S. Pat. No. 2,216,839 to Hoffman utilizes a shank provided with sharp teeth intended to cut into the hose. Sharp teeth may also be provided in this patent on the inside of the sleeve. However, this patent does not suggest any compressive action on the sleeve.

The U.S. Pat. No. 1,825,005 to Loughead, like the U.S. Pat. No. 1,786,489 to Hopkins, provides a rolling-in of the sleeve member but no internal expansion.

In U.S. Pat. No. 2,595,900 to Soos, sharp serrations are provided on the main body while no external compressive action is suggested. Additionally, the expansion of the shoulder must take place against the relatively thick material body of the nut itself.

The Howard U.S. Pat. No., 2,377,010, utilizes a tubular sleeve with external serrations intended to bite into the hose material. However, the external ferrule in this patent is not intended or designed to be compressed.

The U.S. Pat. No. 2,025,427 to Weatherhead is intended for a hose provided with a spirally wound interior flexible metallic sheath. The sleeve is initially deformed to securely attach the hose to the coupling. To obviate any swelling of the non-metallic part of the hose, this patent provides a relatively short nipple intended to be expanded to effect a tight metal-to-metal joint between the nipple and the inner metallic sheath.

However, the holding of the hose is predicated exclusively on the deformation of the sleeve cooperating with the spiral sheath.

The British Patent 1,451,588 relies exclusively on swaging the ferrule onto a tubular insert having peripheral barbs with sharp edges.

In the German Offenlegungsschrift 25 32 624, the sleeve is provided beforehand with circumferential projections with the holding action attributed exclusively to the internal expansion provided with annularly shaped beads.

The French Patent 1,089,603 describes an arrangement in which the sleeve is screwed over the flexible hose by the use of internal threads which again increases the cost of manufacture. Furthermore, there is no suggestion of an external compressive action on the sleeve.

The French Patent 1,533,335 describes an arrangement with external compressive action but without internal expansion.

The British Patent 575,057 relates to a pipe connection in which the sleeve-like part of the body provided with a threaded tapered bore is screwed over a metallic pipe end so that the latter is compressed evermore as it enters the tapered bore. Expansion of the central support member takes place after the pipe is thus threadably secured.

The prior art thus suggests a number of approaches to a hose connection. However, a simple solution, easy to manufacture and install, and assuring extraordinarily high pressure holding abilities can be found only in the present invention which will be described more fully hereinafter.

SUMMARY OF THE INVENTION

The method according to the present invention for fastening a hose onto a nipple provided with an externally ribbed or beaded nipple portion involves the step of expanding the inner diameter of the externally ribbed nipple portion while simultaneously confining the hose against radially outward movement by a tubular, sleeve-like member which has been mounted beforehand over the nipple portion. The sleeve-like member is a simple cylindrical part with a smooth internal surface of a diameter complementary or slightly larger than the external diameter of the hose to facilitate its mounting over the hose. To assure a connection capable of withstanding pressures up to the bursting pressure of the hose, the diametric dimensions of the sleeve-like member are thereafter reduced. This can be achieved by compressing the sleeve-like member with the use of an appropriate tool or by rolling-in radially inwardly extending annular grooves into the sleeve-like member, preferably so located in relation to the annular ribs or beads that the deepest points of the annular grooves occur at least approximately within the spaces of peaks of adjacent ribs or beads. The sleeve-like member may thereby be connected to the nipple by flanging, crimping or upsetting or by rolling the sleeve-like member into an annular groove provided in the nipple which, for ease of manufacture, may take place at the time annular grooves are rolled into the sleeve-like member to further increase the holding ability of the connection.

The hose connection of this invention basically comprises only two elements; namely, a nipple with a nipple portion provided with axially spaced, externally projecting beads or ribs with rounded-off external surfaces and a tubular sleeve-like member with a smooth internal surface and fixed to the nipple whereby the hose is held in place by first expanding the inner diameter of the nipple portion and thereafter compressing the sleeve-like member within the area of the expanded nipple. If the compression is realized by providing the sleeve-like member with radially inwardly extending annular grooves, then the latter are preferably located between adjacent ribs or beads.

The method for fastening the hose onto a nipple and the hose connection with the nipple according to the present invention are relatively simple and inexpensive to manufacture and assemble, yet provide complete tightness at unexpectedly high pressures in a reliable manner, even with reinforced hoses. Additionally, flow losses can be significantly reduced by the present invention by eliminating any differences between the normal inner diametric dimension of the hose and the diametric dimension of the nipple over which the hose is mounted. Additionally, noises which have been noted heretofore in the use of the hose connections having pronounced changes in the diametric dimensions of the flow path and probably caused by oscillations due to reflections, can be reduced by this invention because of the substantially constant internal diameter This may permit the elimination of metallic spirals heretofore required in such hose connection, as for example, in hydraulic lines for power steering systems.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein:

FIG. 1 is a somewhat schematic cross-sectional view of one embodiment in accordance with the present invention prior to expansion of the inner diameter of the nipple portion;

FIG. 2 is a cross-sectional view, similar to FIG. 1, showing the various parts thereof after completion of the inner diameter of the nipple portion;

FIG. 3 illustrates a modified embodiment of a hose connection and method of making the same in accordance with the present invention;

FIG. 5 illustrates the standard parts used in a manufacturing method according to the present invention obviating the need for machining any parts;

FIG. 6 is a cross-sectional view showing the nipple assembled from two standard parts of FIG. 5 with the nipple portion shrunk in its diametric dimension and provided with external beads;

FIG. 7 is a cross-sectional view illustrating the position of the parts of the hose connection after the hose has been placed over the nipple and the sleeve-like member has been placed over the washer;

FIG. 8 is a cross-sectional view, illustrating the completed hose connection after internally expanding the nipple portion and cold-deformation of the sleeve-like member;

FIG. 9 schematically illustrates how a tubular member used for the nipple can be shrunk in the course of the cold deformation process; and FIG. 10 is a cross-sectional view of the pre-assembled parts of a hose connection made by a method slightly different from that of FIGS. 5-8.

DETAILED DESCRIPTION OF THE DRAWINGS

Figure 4:
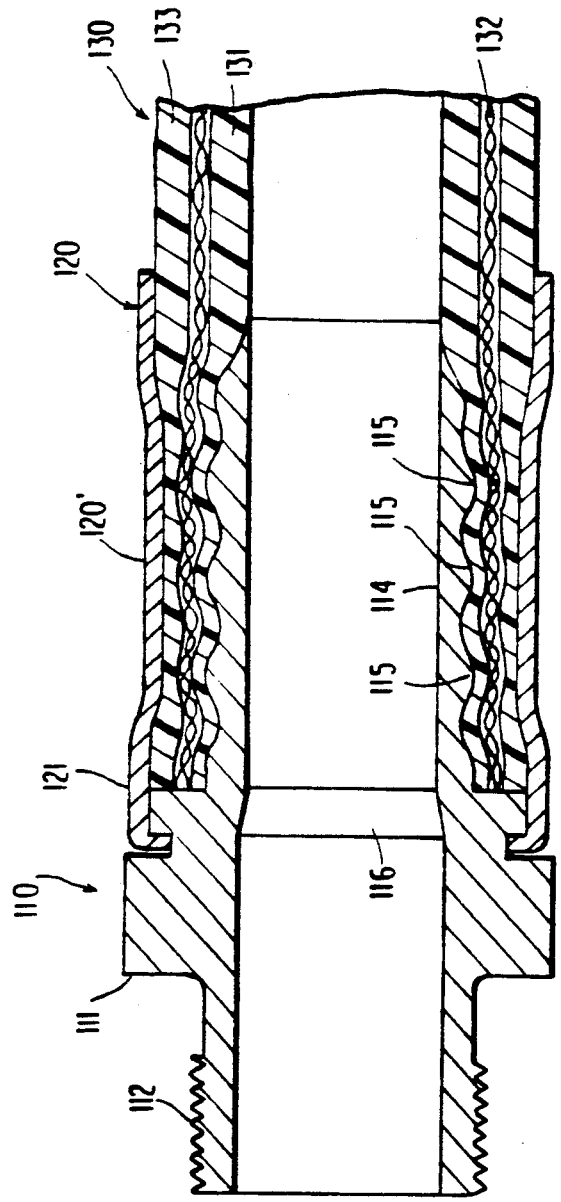
FIG. 4 is a cross-sectional view, similar to FIG. 2, of a still further modified embodiment of a hose connection in accordance with the present invention for a metallically reinforced hose.

Referring now to the drawing, wherein like reference numeral are used to designate like parts throughout the various views, and more particularly to FIG. 1, the nipple generally designated by reference numeral 10 includes a main portion 11 whose external surface is shaped to cooperate with a tool such as a socket wrench. The main portion 11 is integral with an externally threaded connecting portion 12. A nipple portion 14 extends from the main portion 11 opposite the connecting portion 12 whose internal diameter D2 is smaller than the internal diameter D1 of the main portion 11 and connecting portion 12 by an amount determined by the conical portion 16. The nipple portion 14 is additionally provided with outwardly extending annular beads or ribs 15 which have a rounded-off profile to avoid any sharp edges that might damage the hose by cutting. As can be seen in FIG. 1, both the peaks and troughs of the annular beads or ribs 15 are rounded-off in any appropriate manner. The conical portion 16 which is relatively short in relation to the axial length of the main portion 11 and the nipple portion 14, is located axially offset from the main portion 11 in the direction toward the nipple portion 14 and of a thickness in the radial direction considerably less than that of the main portion 11 and of the same order as the maximum thickness of the annular beads or ribs 15. This facilitates the internal extension because such expansion takes place only against limited material thicknesses.

A sleeve-like member generally designated by reference numeral 20 is affixed to the nipple 10 by means of the bent-off end 21 extending into recess 17 provided therefor in the nipple 10. The fixing of the sleeve-like member 20 at the nipple 10 may take place by any known means such as crimping, upsetting, flanging and the like. The hose generally designated by reference numeral 30 which is made from any suitable hose material is located within the space between the nipple portion 14 and the sleeve-like member 20. The inner diameter of the sleeve-like member 20 which is smooth and the outer diameter of the annular beads or ribs 15 are thereby so selected that the hose 30 can be slipped into the space over the nipple portion 14 or the nipple portion 14 can be readily inserted into the hose 30 without any danger of damaging the hose, after the sleeve-like member 20 has been slipped over the end of the hose 30 to such an extent that the bent-end 21 of the sleeve-like member is near the hose end.

Reference numeral 40 generally designates an expanding tool which includes a rod 41 on which are mounted the expanding member or members 42, 43 made of any suitable hardened material. It is preferable to utilize several expanding members of increasing external dimensions so that the expansion of the nipple portion 14 can be realized in several steps with the absolute value of expansion during each step being thus smaller than would be required if a single expanding member were used. The expanding members 42 and 43 may thereby be of, for example, spherical configuration or conical configuration as shown. The number thereof can be chosen at will depending on existing conditions. Furthermore, the expanding members may all be of the same shape, spherical or conical, or may be some spherical and some conical. For convenient mounting of the expanding members 42, 43, the rod is externally threaded so that the expanding members can be held in predetermined positions by the use of nuts (not shown). However, any other known method of fastening the expanding members 42, 43 on rod 41 may be used. Additionally, the expanding member(s) may be made in one piece with the rod.

The connection according to the present invention takes place as follows. The sleeve-like member 20 is slipped over the hose 30, from the left end thereof as viewed in FIG. 1 so as to be over the hose 30 within the area of the free (left) end thereof. As the internal surfaces of the sleeve-like member 20 are smooth and in its diameter D3 complementary to or slightly larger than the outside diameter of the hose 30, this can be done without difficulty.

The rod 41 of the expanding tool 40 is extended from the right as viewed in FIG. 1 through the nipple 10 and the nipple portion 14 is then inserted into the hose 30 so that the parts assume the position shown in FIG. 1. The external dimensions of the annular beads or ribs 15 are thereby so chosen that the insertion of the nipple portion 10 into the hose 30 can be readily realized without danger of damage to the hose or undue stresses in the hose material. To that end the nipple portion may also have a slight taper converging in the direction toward its free end. The sleeve-like member 20 may at this point be fixed to the nipple 10 as shown in FIG. 1 or may be fixed thereto after the nipple portion 14 has been expanded, as will be described more fully hereinafter. By a suitable tool, the rod 41 is then pulled toward the left as indicated by the arrow in FIG. 1 so that the expanding members 42 and 43 will sequentially expand the inner diameter of the nipple portion 14 until it has the inner diametric dimension D'2 as shown in FIG. 2 which is substantially identical to the internal diameter of the hose 30 and preferably differs therefrom only little, if at all. By slightly tapering the free end of the nipple portion 14, any differences between these dimensions after the internal expansion are bridged by a smooth transition (FIG. 2). As can also be seen from FIG. 2, the expanded internal diametric dimension D'2 is slightly smaller than the internal diametric dimension D1 so that a small tapered portion 16' remains with the expansion essentially taking place only within an area of the nipple portion 14 whose maximum thickness is determined by the thickness within the area of the beads or ribs 15. To increase the holding ability of the hose connection, the sleeve-like member 20 is then reduced in its diametric dimensions, for example, by means of a conventional tool compressing the sleeve-like member 20 as indicated by dash-lines 20'. In the alternative, the reduction in diametric dimension may be achieved by rolled-in grooves 22 as will be described more fully hereinafter by reference to FIG. 3. As can be seen by comparing FIG. 2 with FIG. 1, the difference between the diametric dimensions D1 and D2 of FIG. 1 is greater than the difference between the diametric dimensions D1 and D'2 of FIG. 2 so that the flow losses which occur as a result of the conical portion 16 are reduced in the completed hose connection of FIG. 2 and the inner diametric dimension D'2 of the nipple portion 14 corresponds at least very closely to the inner diameter of the hose 30.

FIG. 3 illustrates a modified embodiment in accordance with the present invention in which the sleeve-like member 20 is secured to the nipple 10 by rolling-in an annular groove 22' to engage in annular groove 17' provided therefor in the nipple 10 and rolling-in the annular grooves 22 to increase the holding ability of the hose connection. As can be seen also from FIG. 3, the greatest depth of the annular rolled-in grooves 22 are thereby located between the peaks of the annular beads or ribs 15 in the nipple portion 14 so as to maximize the holding ability of the hose connection. Additionally, FIG. 3 differs from the embodiment of FIGS. 1 and 2 in that the expanding is realized by pushing the tool 40 into the nipple 10 which requires that the position of the smaller expanding member 42 relative to the larger expanding member 43 is reversed compared to that in FIG. 1. Conventional means may thereby be used in FIGS. 1-3 to apply the necessary force to the tool 40 while holding the nipple 10 in place. For use in the field, a manual tool utilizing a corkscrew-type mechanism can be used. For automated mass production other conventional means may be used to install the hose connection.

In a typical example, a hose reinforced with a nylon fabric and made by the Gates Rubber Company of Denver, Colo., was used. This hose had an outside diameter of about 27 mm. and an inside diameter of about 19 mm. The nipple with an outside diameter of about 20 mm. was inserted into this hose. The nipple can thereby be machined from a single piece of stock. In the alternative, the nipple portion 14 can be made of tubular stainless steel or other suitable expandable material and can then be assembled with the main part 11. Additionally, it may be advantageous to make the nipple 10 from a malleable casting.

The special tool 40 (FIG. 2) consisting of rod 41 and one, two or more spherical members 42 and/or cone-shaped members 43 was then inserted into the hose 30 whereupon the nipple 10 is placed over the rod 41 and is thereafter inserted into the hose 30. The expanding members 42 and 43 can be secured on the rod 41, for example, by nuts (not shown) located on both sides of a respective expanding member and threadably engaging external threads provided on the rod 41. However, any other manner of securing the expanding members 42 and 43 can also be used which will hold the same in place. Furthermore, the expanding tool can also be machined from a single part made of suitable material, for example, of any known hard metal used, for instance, in cutting tools. In the described example, the inner diameter of the nipple portion 14 which originally had a value of 15 mm. was expanded by the expanding tool 40 to 18 mm. Thereafter, the sleeve-like member 20 was fixed to the nipple 10 by rolling-in the annular groove 22' and the annular grooves 22 were then formed in the sleeve-like member 20 by known means, for example, with the aid of a tool used in cutting pipes in which the cutting rollers are replaced with rollers having rounded-off edges. The hose of this example which was equipped with hose connections according to this invention at both ends thereof of the type shown in FIG. 3, burst at a pressure of 850 bar without any adverse influence on the hose connections themselves.

The sequence of operating steps outlined above, which involves first expanding the nipple portion and only thereafter subjecting the sleeve-like member to compressive action is important for a number of reasons. By first expanding the nipple portion, the initial outside dimensions of the nipple portion can be selected so as to permit easy insertion of the nipple portion into the hose without undue stress or damage to the hose itself. The nipple can then be expanded so as to conform with its inner diameter to the inner diameter of the hose in order to eliminate any flow losses or abrupt edges which might cause noise problems. By subsequently subjecting the sleeve-like member to compressive forces within the area of the expanded nipple portion, the interior diameter of the nipple portion remains essentially unaffected. Furthermore, if a compressing tool is used, such as a pneumatic crimping tool, any variations in the dimensions of the hose, which exist inherently due to tolerances, will be automatically compensated for because the pneumatic tool will always apply the same force and therefore compress the sleeve-like member only to the extent permitted by such predetermined force. This assures always the same expansion of the nipple portion to the same internal diametric dimension for optimum through-flow while at the same time permitting the nipple to be inserted freely into the hose. As the internal diameter of the nipple portion is the important dimension in the assembled hose connection, the sequence of operating steps according to the present invention is important to assure expansion of the nipple portion always to the same internal diametric dimension. It also permits to minimize stressing of the rubber hose when the nipple is inserted and to subject the hose to a maximum internal stress by controlling accurately the force used in compressing the sleeve-like portion.

FIG. 4, in which similar reference numerals of the 100 series are used for the same parts as in FIGS. 1 and 2, illustrates a hose connection for a rubber-like hose provided with an internal metallic reinforcing sheath. In FIG. 4, the nipple generally designated by reference numeral 110 again includes a main portion 111 which is integral with an externally threaded connecting portion 112. The external surface of the main portion 111 is again shaped to cooperate with a tool, such as a socket wrench. A nipple portion 114 extends from the main portion 111 on the side opposite the connecting portion 112 whose internal diameter is initially smaller than the internal diameter of the hose generally designated by reference numeral 130. The internal diameter of the main portion 111 and of the connecting portion 112 may be slightly larger than the internal diameter to which the nipple portion is expected to be expanded with a conical section 116 providing the transition. This will facilitate free passage of the expanding tool through the main and connecting portions 111 and 112. The nipple portion 114 is again provided with outwardly extending beads or ribs 115 which have a rounded-off profile to avoid any sharp edges that might damage the hose by cutting. Additionally, the nipple portion 114 might slightly taper toward its free end so as to further facilitate insertion into the hose 130. The expansion of the nipple portion then preferably takes place in the manner shown in FIGS. 1 and 2.

The sleeve-like member generally designated by reference numeral 120 is affixed to the nipple and more particularly to the main portion 111 thereof by any suitable means, such as rolling-in or plastic deformation into a groove as shown in FIG. 4 and indicated schematically by reference numeral 121. The sleeve-like member 120 is again reduced in its external diametric dimension within the area of the expanded nipple portion 114, indicated by reference numeral 120' in FIG. 4. This may take place again by any known tool, such as a crimping tool.

As a result of the initial internal expansion of the nipple portion 114 to essentially the inner diameter of the hose 130, the inner portion 131 of the hose inside of the metallic reinforcing sheath 132 is compressed, without, however, affecting to any great extent the metallic sheath 132. When the compressive forces are thereafter applied to the sleeve-like member 120, the outer rubber-like hose portion 133 is compressed without, however, significantly affecting the metallic sheath which, as a result of the expansion and compression, may be slightly reduced in diameter though its position and rectilinear configuration is affected only to a minor extent. This is important because by suitably selecting the dimensions and the nipple material as regards ductability and by thereafter selecting an appropriate compressive force, it is possible to minimize any damage to the metallic sheath 132. In other words, the danger of damage to the metallic sheath 132, for example, by undue compressive or bending forces, can be minimized by the present invention. In one experiment utilizing a reinforced hose, the hose burst at a pressure of 1,600 bar without any adverse effect on the two hose connections in accordance with the present invention which were installed at both ends thereof.

The various embodiments of the hose connections described so far rely on machining of the nipple including the nipple portion. However, machining is time-consuming and relatively expensive and therefore not particularly suited for mass production. Similar considerations apply to the parts of the prior art discussed above which require machining.

According to the present invention, these disadvantages are obviated by a manufacturing process relying on relatively inexpensive standard parts which are assembled into the hose connection exclusively by cold deformation. Referring to FIGS. 5 through 10, where similar reference numerals of the 200 series are used, and more particularly to FIG. 5, the hose connection in accordance with the present invention requires only three standard parts, namely, a section of pipe or tubular member generally designated by reference numeral 210 and cut to predetermined length, a standard washer 211 and a second pipe or tubular section generally designated by reference numeral 220 and also cut to predetermined length. The washer 211 is provided with a central hole 211' slightly larger than the outside diameter of the tubular member 210 while the internal diameter of the tubular member 220 is slightly larger than the outer diameter of the washer 211. As will be described more fully hereinafter, the tubular member 210 and washer 211 will be cold-deformed into the nipple while tubular member 220 will be used again as external sleeve-like member of the hose connection in accordance with the present invention.

According to the method of the present invention, the washer 211 is slipped over the tubular member 210 into predetermined position where it is held by any known means during the subsequent cold-deformation. The sharp edges of the washer 211 as shown in FIG. 5 may thereby be rounded-off by any known means, e.g., by deburring, before being assembled over the tubular member 210. In the course of the cold-deformation operation, the tubular member 210 is shrunk in the part intended to constitute the nipple portion 214 to a reduced diameter a. FIG. 9 which schematically shows how a tubular member 210 of FIG. 5 can be shrunk, also indicates the resulting tapering transition portion 216. During the cold-deformation operation, the beads or ribs 215 are also formed in the area of the shrunk nipple portion 214 and the washer 211 is secured in position by the outwardly extending beads 218 and 218' (FIG. 6).

The nipple shown in FIG. 6 can thereby be manufactured in the course of a single blow or impact used in the cold deformation process.

Next, the hose 230 is slipped over the nipple portion 214 with reduced diameter until the hose comes close to or abuts at the washer 211. The sleeve-like member 220 is then slipped over the washer 211 and the hose 230 as shown in FIG. 7. The nipple portion 214 is then internally expanded again to its original diameter as shown in FIG. 8, i.e., to the original internal diameter of the tubular member 210. Finally, the sleeve-like member 220 is cold-deformed as also shown in FIG. 8 to reduce its diameter either by the use of inwardly extending, rolled-in grooves 222 as shown in FIG. 8 or by compressing the same as shown in FIG. 2. In either case, the deformation of the sleeve-like member 220 should be made in such a manner that a flare-like end 223 results between points b and c to protect the hose against movements.

As mentioned above, FIG. 9 illustrates how a tubular member 210 can be deformed by shrinking part of its length to the reduced diametric portion 214 with reduced diameter a.

The method described by reference to FIGS. 5 through 9 permits a rational and economic manufacture of a hose connection in accordance with the present invention which entails all of the advantages described in connection with the embodiments of FIGS. 1 through 4, yet obviates the drawbacks connected with the need to machine parts of the nipple. As with the embodiments of FIGS. 2 through 4, the hose connection realized by the method disclosed in FIGS. 5 through 9 will again automatically compensate for tolerances by first expanding the nipple portion 214 before the sleeve-like member 220 is cold-deformed to fasten it over the washer 211 by the in-turned edge 221 and by providing either the rolled-in grooves 222 or a reduced diametric portion realized by a crimping tool and as explained in detail by reference to FIG. 4.

FIG. 10 illustrates a hose connection in accordance with the present invention and manufactured by a modified method. Differing from the method according to FIGS. 5-9, the sleeve-like member is cold-deformed at 221 to secure it over the washer 211 of the nipple assembly 210, 211 after the latter has been made in the manner described in connection with FIGS. 5 and 6. The preassembled hose connection of FIG. 10 is then ready for use also in the field by inserting the hose 230 into the space between the sleeve-like member 220 and the nipple portion 214 of still reduced diameter, whereupon the nipple portion 214 is internally expanded and finally the sleeve-like member is cold-deformed, for example, by the use of a crimping tool as shown in FIG. 4. However, the cold-deformation of FIG. 3 may also be used with the sleeve-like member 220 of FIG. 10 if an appropriate tool is available in the field.

As in the preceding embodiments, both the nipple portion 214 as well as the sleeve-like member 220 are devoid of any sharp edges which would cut into the hose material and endanger the hose connection under high pressures.

Tests have also indicated that the time for a predetermined amount of liquid, water in the actual tests, could be considerably reduced by the use of the present invention in comparison to high pressure hose connections presently used in the industry. The time for one liter of water to flow through a hose connection with the present invention could be reduced by more than half in comparison to hose connections as are commercially used, for example, in the automotive industry.

The sleeve-like member underwent a slight reduction in diameter as a result of the compressive action. The amount depended on the particular material and the initial dimensions of the sleeve-like member. However, the amount of reduction in thickness of the sleeve-like member was usually less than 10% and normally of the order of about 6 to 8%. The reduction of the sleeve-like member as a result of the compressive forces applied thereto in the examples of FIGS. 2 and 4 will also vary, depending on variations in the tolerances of the hose material because, as pointed out above, these tolerances can be automatically compensated by the use of a predetermined force in the, for example, pneumatically actuated crimping tool.

The most varied materials such as steel, stainless steel, brass, bronze, aluminum, plastic material, etc. may be used as materials for the various parts of the hose connection in accordance with the present invention.

A hose connection in accordance with the present invention thus offers the significant advantage that the hose will burst, even in case of a reinforced hose before the nipple is expelled with great force and high velocity by the very high pressures in the hose. Tests have indicated that hose connections in accordance with the present invention reliably satisfy these requirements under all conditions.

This invention also offers the enormous advantage that, owing to the radially outward expansion of the nipple portion, the inner diameter of the nipple portion no longer reduces the medium passage therethrough as is the case with numerous known connections of this type. In other words, if a certain required quantity of hydraulic or pneumatic medium has to pass through the hose within a given period of time in order to be able to carry out a certain amount of work, it is possible to carry out the same amount of work with a hose that can have a smaller diameter than the previously used hose that had a larger diameter. Stated differently, in order to carry out the same amount of work, it is possible to do so with hoses of smaller diameter by the use of the present invention than was possible heretofore with hoses of larger diameter. Hoses of smaller diameter are less costly and also more easy to handle and more flexible. Additionally, a small nipple for the hose connection is considerably less expensive than a larger nipple required for larger hoses.

The hose connection in accordance with the present invention also adapts itself readily to hose repairs in the field. This can be done even manually if the rod 41 of the tool is provided with a fine threaded portion. This is of great significance with heavy machinery such as road-building equipment whose hourly operating costs may well exceed $1,000.00 per hour. However, most significantly, the hose connection and method of installing the same not only offers a significant simplification in the field of hydraulic high pressure lines but assures a great safety to prevent accidents and catastrophes which might otherwise jeopardize human lives, for example, in heavy-duty equipment, aircrafts, ships, etc.

Furthermore, the reliability of the hose connection in accordance with the present invention permits to the designing engineer to calculate the pressure required for a given job and to then select the hoses required to carry these pressures. Hoses which can withstand high pressures are of relatively little use if they cannot be connected to a nipple with complete safety as is the case with the present invention.

While I have shown and described only two embodiments in accordance with the present invention, it is understood that the same is not limited thereto but is susceptible of numerous changes and modifications as known to those skilled in the art. For example, the thickness and type of material used for the sleeve-like member 20 can be chosen to match the forces which it must be able to withstand. I therefore do not wish to be limited to the details shown and described herein but intend to cover all such changes and modifications as are encompassed by the scope of the appended claims.

I claim:

1. A method for establishing a high pressure hose connection by fastening a hose in the area of its free end onto a nipple structure provided with an externally ribbed nipple portion, comprising the steps of slipping a tubular sleeve-like member of cylindrical configuration over the free end of the hose, thereupon mounting the hose over the externally ribbed nipple portion with the sleeve-like member in such a position as to be substantially coextensive with the ribbed nipple portion, thereafter expanding the inner diameter of the externally ribbed nipple portion to a dimension at least approximately equal to the internal dimension of the hose while the hose is confined against radially outward movement by the tubular sleeve-like member extending over the nipple portion, and thereupon reducing the diametric dimension of the sleeve-like member within at least a substantial part of the overlapped area of the nipple portion.

2. A method according to claim 1, wherein the diametric dimension of the sleeve-like member is reduced by rolling radially inwardly extending annular grooves into the sleeve-like member within the area of the nipple portion.

3. A method according to claim 2, wherein the nipple portion is provided with spaced annular ribs, and wherein the radially inwardly extending annular grooves rolled into the sleeve-like member are so located in relation to the annular ribs that the deepest points of said annular grooves occur at least approximately within the spaces between peaks of adjacent ribs.

4. A method according to claim 1, wherein the diametric dimension of the sleeve-like member is reduced by crimping the sleeve-like member within the area of the expanded nipple portion.

5. A method according to claim 1, further comprising the step of fixing the sleeve-like member to the nipple.

6. A method according to claim 5, wherein the sleeve-like member is fixed to said nipple prior to mounting the hose over the nipple portion.

7. A method according to claim 5, wherein the sleeve-like member is fixed to the nipple by upsetting, crimping or flanging over.

8. A method according to claim 5, wherein the sleeve-like member is fixed to the nipple by rolling at least one inwardly extending groove into the sleeve-like member within the area of a groove provided therefor in the nipple.

9. A method according to claim 8, wherein several inwardly extending grooves are rolled into the sleeve-like member within the area of the nipple portion during the same operation as fixing the sleeve-like member to the nipple by rolling-in the at least one inwardly extending groove.

10. A method according to claim 9, wherein the nipple portion is provided with spaced annular ribs, and wherein the radially inwardly extending annular grooves rolled into the sleeve-like member within the area of the nipple portion are so located in relation to the annular ribs that the deepest points of said annular grooves occur at least approximately within the spaces between peaks of adjacent ribs.

11. A method according to claim 7, wherein the sleeve-like member is fixed to the nipple after the nipple is inserted into the hose.

12. A method according to claim 1, wherein the sleeve-like member is reduced by the application of a predetermined force to compensate for manufacturing tolerances without substantially affecting the at least approximate equality between the normal inner diametric dimension of the hose and the inner diameter of the expanded nipple portion to thereby minimize flow losses.

13. A method according to claim 1, wherein the nipple portion is expanded substantially uniformly over its entire length to minimize any differences between the normal inner diametric dimension of the hose and the inner diameter of the expanded nipple portion.

14. A method for fastening a hose onto a nipple structure which includes a main portion externally provided with a tool-engaging surface connected with the nipple portion by way of a conical portion according to claim 1, wherein the inner diameter of the nipple portion is expanded to a diametric dimension slightly smaller than the inner diameter of the main portion to leave the conical portion shortened in length between the main portion and the nipple portion.

15. A method according to claim 14, wherein the conical portion is located axially offset from the main portion and has a thickness of the order of the maximum thickness of the nipple portion.

16. A method according to claim 1, wherein the nipple portion is made of readily expandable material differing from the material of the main portion of the nipple and is affixed to the main portion prior to its use with the hose.

17. A method for establishing a high-pressure connection between a nipple structure and a reinforced hose whose reinforcement is associated with the hose at a radial distance from the inner diameter thereof according to claim 1, when the initial expansion of the inner diameter of the nipple portion and the subsequent reduction of the external diameter of the sleeve-like hose member are so selected and controlled as to leave the reinforcement without any substantial change in its location and structure relative to its original location and structure in the hose.

18. A method according to claim 17, wherein the reinforcement is embedded within the hose between an inner hose part and an outer hose part.

19. A method according to claim 18, wherein the dimensions and material of the nipple portion are so chosen that expansion of the nipple portion primarily affects only the inner hose part while the dimensions and material of the sleeve-like member are so chosen that the forces applied to the sleeve-like member for reducing its outer dimensions affect primarily only the outer hose part.

20. A method for an economic manufacture of a nipple for use in a high-pressure hose connection, comprising the steps of placing a washer in predetermined position over a tubular member having smooth inner and outer surfaces, and cold-deforming the thus-assembled tubular member and emplaced washer by a) reducing the diameter of the tubular member within the area intended as a nipple portion, b) providing outwardly extending beads of rounded-off external shape distributed over the length of the nipple portion, and c) securely fixing the washer in position by outwardly extending beads on both sides thereof.

21. A method according to claim 20, wherein the steps a) through c) are realized during a single impact of the cold deformation operation.

22. A method for making a high pressure hose connection, comprising the steps of mounting a hose over the nipple portion of a nipple made in accordance with claim 36, placing a sleeve-like member externally over the washer and the hose, internally expanding the nipple portion substantially to its original internal diameter, and thereafter cold-deforming the sleeve-like member to secure it over the washer and reducing its diametric dimension at least within a major part of the area of the internally expanded nipple portion.

23. A method according to claim 22, wherein a flared end portion is provided during the step of cold deformation at the end of the sleeve-like member opposite the washer.

* * * * *